Figure 1:
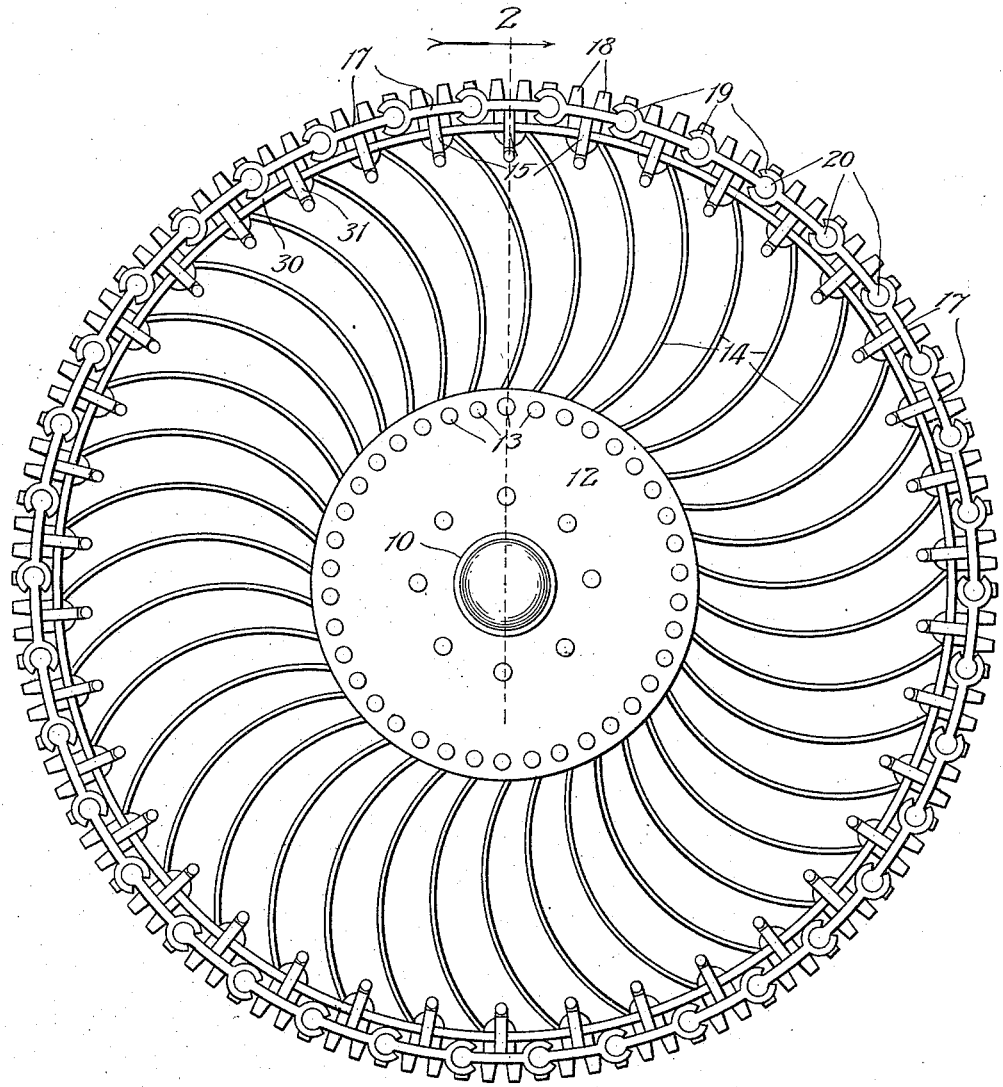

W. H. FAHRNEY.
SPRING VEHICLE WHEEL.
APPLICATION FILED JAN. 14, 1916.

1,260,655.

Patented Mar. 26, 1918.
2 SHEETS—SHEET 1.

Witnesses:

Inventor:
William H. Fahrney,
By Dyrenforth, Lee, Chritton and Wiles
Attys.

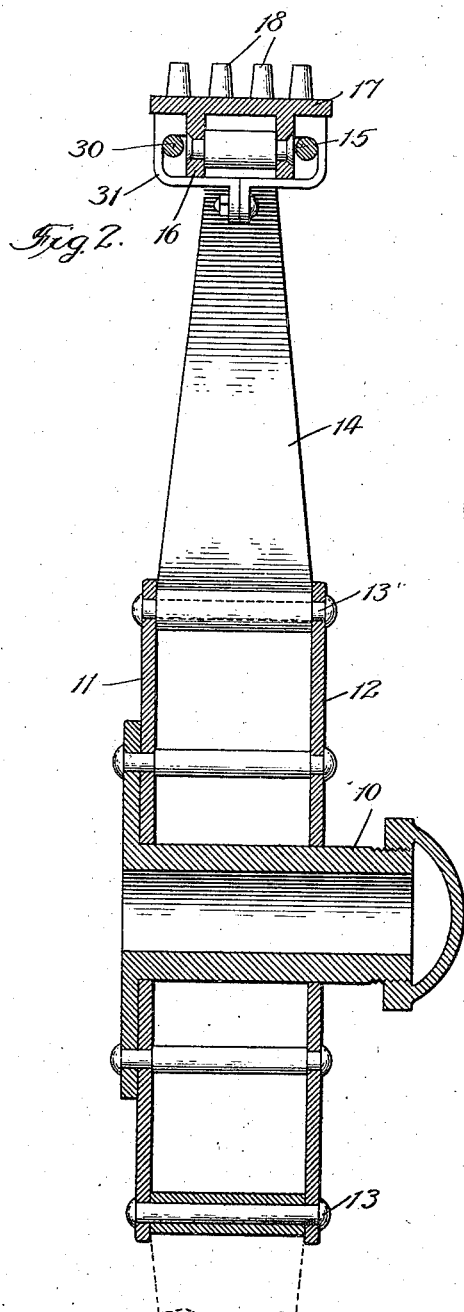
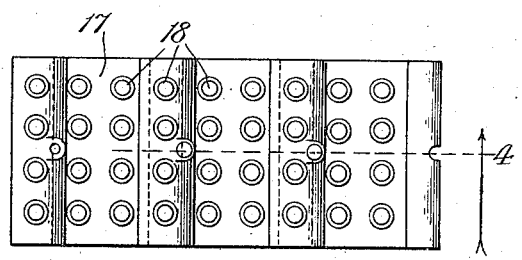
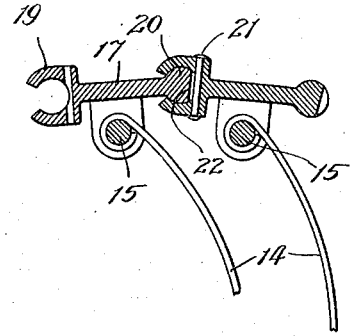

UNITED STATES PATENT OFFICE.

WILLIAM H. FAHRNEY, OF CHICAGO, ILLINOIS.

SPRING VEHICLE-WHEEL.

1,260,655.

Specification of Letters Patent.

Patented Mar. 26, 1918.

Application filed January 14, 1916. Serial No. 72,097.

*To all whom it may concern:*

Be it known that I, WILLIAM H. FAHRNEY, a citizen of the United States, residing at Chicago, in the county of Cook and State of Illinois, have invented a new and useful Improvement in a Spring Vehicle-Wheel, of which the following is a specification.

My invention relates to an improvement in the class of vehicle wheels in which an annular rim or tire is connected with the hub by a series of generally radial interposed springs which serve as spokes. More particularly, my present invention is concerned with an improvement in that type of wheel described and claimed in my prior Patent No. 1,098,028 of May 26, 1914.

The object of my present invention is to provide a wheel of this type but having a rim made up of rigid units, each connected to a spoke, and jointed together so as to be capable of relative movement under load.

My new wheel construction is especially adapted to commercial vehicles of great weight and to road and agricultural tractors.

The invention will be more fully understood from the following description of one specific embodiment of the same. In this description reference will be had to the accompanying drawings in which—

Figure 1 is a side elevation of a complete tractor wheel constructed according to my invention, Fig. 2 is a section on the line 2 of Fig. 1, Fig. 3 is an enlarged plan view of a portion of the rim or tread of the wheel, and Fig. 4 is a section on the line 4 of Fig. 3.

Referring more particularly to the drawings, 10 designates a suitable hub construction having spaced flanges 11, 12, between which are mounted pins 13 for journaling the inner ends of the spring spoke members. These latter, designated 14, in the drawing, are preferably of tapering cross-section as shown in Fig. 2, and curved in the general form of a circular arc, with rolled ends for embracing the pins 13 at the hub and similar pins at the rim.

The rim pins 15 are mounted between ears 16 formed upon or secured to the rim units 17. In the embodiment shown in the drawing each rim unit comprises a flat body portion having traction lugs or spurs 18 on the face opposite the ears 16, and having one end formed to provide a slotted cylindrical bearing sleeve 19 and the opposite end formed to provide a complementary bearing 20. The rim sections are assembled by sliding the bearings 20 endwise into the sleeves 19, the parts being then locked against displacement by pins 21 which engage the side walls of slots or saw kerfs 22 in the bearings 20. By this construction each rim unit is capable of a limited oscillation with respect to its connected units, the complete rim forming an incompressible belt or chain of rigid sections flexibly secured together.

In assembling my wheel each spoke 14 must be flexed outwardly or sprung open a predetermined amount, it being preferred to so proportion the number and strength of the spokes that the vertical component of the normal centripetal force exerted by the spokes in the upper half of the wheel shall equal or exceed the load which the hub supports, as explained in my prior patent referred to. Under these conditions the upper half of the wheel will remain undeformed and truly concentric with the hub, while the lower half, will, under the load of the vehicle, flatten slightly at the point of contact with the ground and bulge proportionately between the contact point and the horizontal diameter.

In order to insure against the rim sections buckling, due to the tension of adjacent spokes being slightly unequal or to other disturbing factors, I deem it advisable to employ a pair of light resilient circular bands 30 which may be held in place by split C-clamps 31 of the form shown in Fig. 2. While these bands are not sufficiently rigid to resist in any measurable degree the deformation of the wheel under load, they are of ample strength to overcome any buckling tendency and maintain the rim sections in their normal positions.

By the construction of the present invention this capability of the wheel to deform under load without altering the concentric relationship of the parts is increased, due to the fact that the rim itself may freely take the curvature which the spokes tend to impress upon it. The rigidity inherent in any form of continuous rim such as the rim of my prior patent is therefore lacking in the present structure, and as a result the only substantial radial forces in action are those of the spokes, the hub, and the ground contact.

The wheel of my present invention may be so designed as to flatten considerably under load, giving a very large contact area and simulating in action the well-known caterpillar structure, the rim of the wheel itself serving as the belt.

Although I have shown and described in considerable detail one specific embodiment of my invention, it is to be understood that this showing and description is illustrative only and for the purpose of making my invention more clear, and I do not regard the invention as limited to the embodiment thereof which I have chosen as an illustration, except in so far as I have included such limitations within the terms of the following claim, in which it is my intention to claim all novelty inherent in my invention as broadly as is possible in view of the prior art.

What I claim as new and desire to secure by Letters Patent is:—

A spring wheel comprising a rim portion made of a plurality of rigid members jointed together to form an endless belt, a resilient spoke connecting each of said members with the wheel center and exerting a predetermined centripetal force on its connected member, and resilient bands for preventing buckling of the said sections.

WILLIAM H. FAHRNEY.

In presence of:
A. C. FISCHER,
K. ONEILL.

Copies of this patent may be obtained for five cents each, by addressing the "Commissioner of Patents, Washington, D. C."